Aug. 6, 1935. R. K. ROWELL Re. 19,663

AUTOMATIC CAM GRINDING MACHINE

Original Filed March 6, 1926 14 Sheets-Sheet 1

INVENTOR.
R. K. ROWELL.
BY
ATTORNEY.

Aug. 6, 1935. R. K. ROWELL Re. 19,663

AUTOMATIC CAM GRINDING MACHINE

Original Filed March 6, 1926 14 Sheets-Sheet 2

INVENTOR.
R. K. ROWELL.
BY
ATTORNEY.

AUTOMATIC CAM GRINDING MACHINE

Original Filed March 6, 1926 14 Sheets-Sheet 3

INVENTOR.
R. K. ROWELL.
BY E. W. Bedford
ATTORNEY.

AUTOMATIC CAM GRINDING MACHINE

Original Filed March 6, 1926 14 Sheets-Sheet 4

INVENTOR.
R. K. ROWELL.
BY
ATTORNEY.

AUTOMATIC CAM GRINDING MACHINE

Original Filed March 6, 1926 14 Sheets-Sheet 5

INVENTOR.
R. K. ROWELL.
BY
ATTORNEY.

AUTOMATIC CAM GRINDING MACHINE

Original Filed March 6, 1926 14 Sheets-Sheet 6

INVENTOR.
R. K. ROWELL.
BY E. W. Bradford
ATTORNEY

AUTOMATIC CAM GRINDING MACHINE
Original Filed March 6, 1926 14 Sheets-Sheet 7
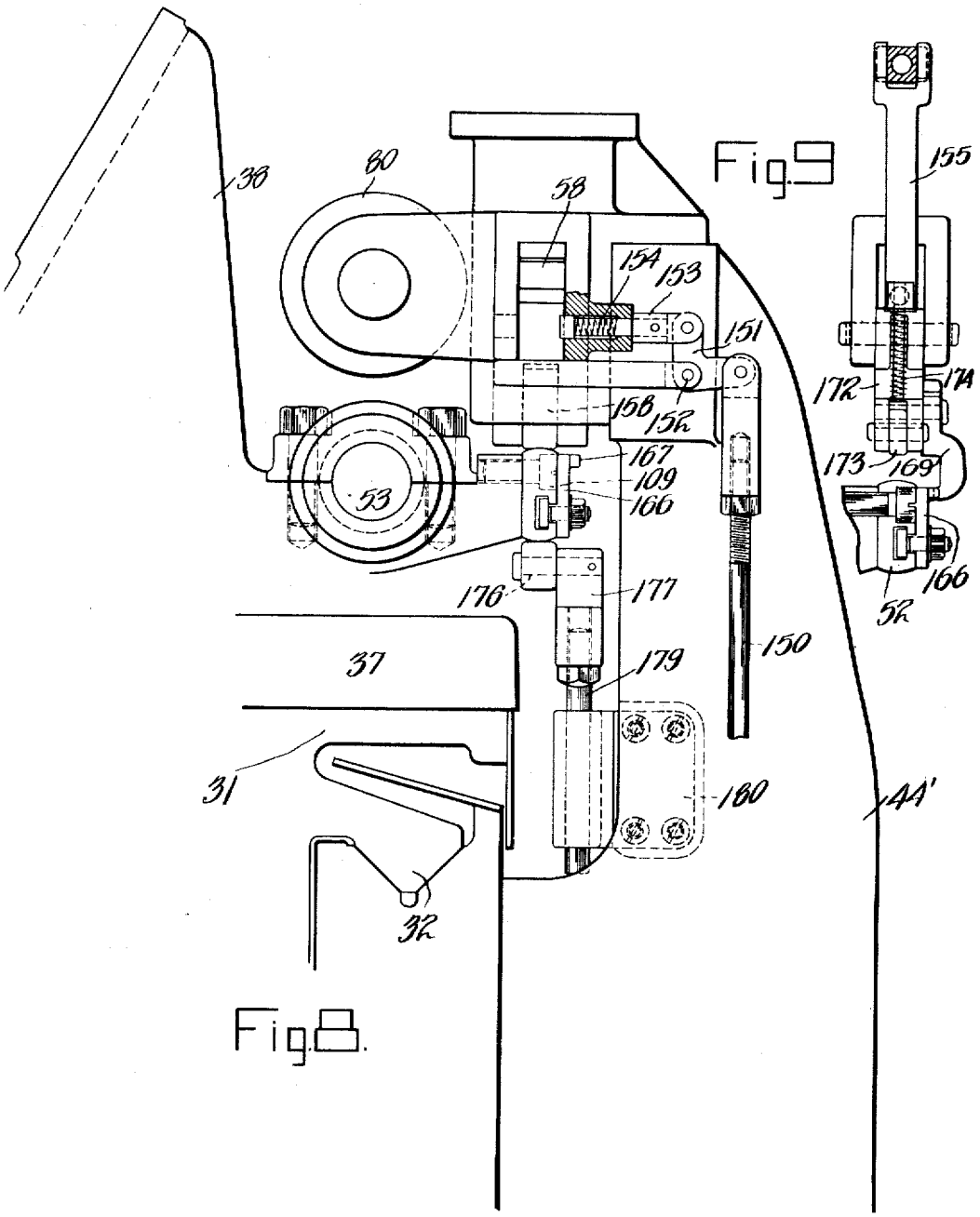
INVENTOR.
R. K. ROWELL.
BY
ATTORNEY.

AUTOMATIC CAM GRINDING MACHINE

Original Filed March 6, 1926 14 Sheets-Sheet 8

INVENTOR.
R. K. ROWELL.
BY E. W. Bradford
ATTORNEY.

AUTOMATIC CAM GRINDING MACHINE
Original Filed March 6, 1926 14 Sheets-Sheet 9
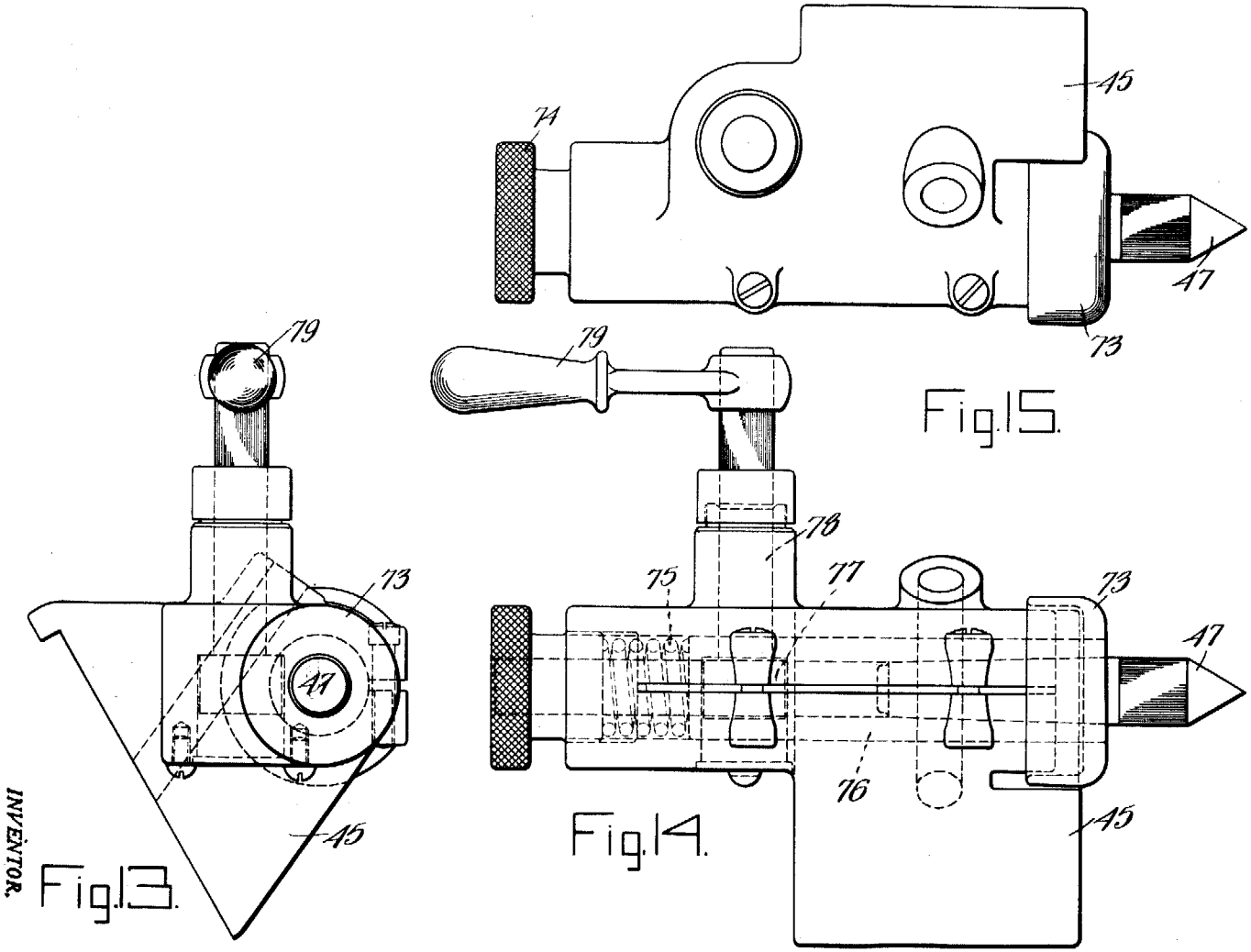
INVENTOR.
R. K. ROWELL.
BY
ATTORNEY.

AUTOMATIC CAM GRINDING MACHINE
Original Filed March 6, 1926 14 Sheets-Sheet 10
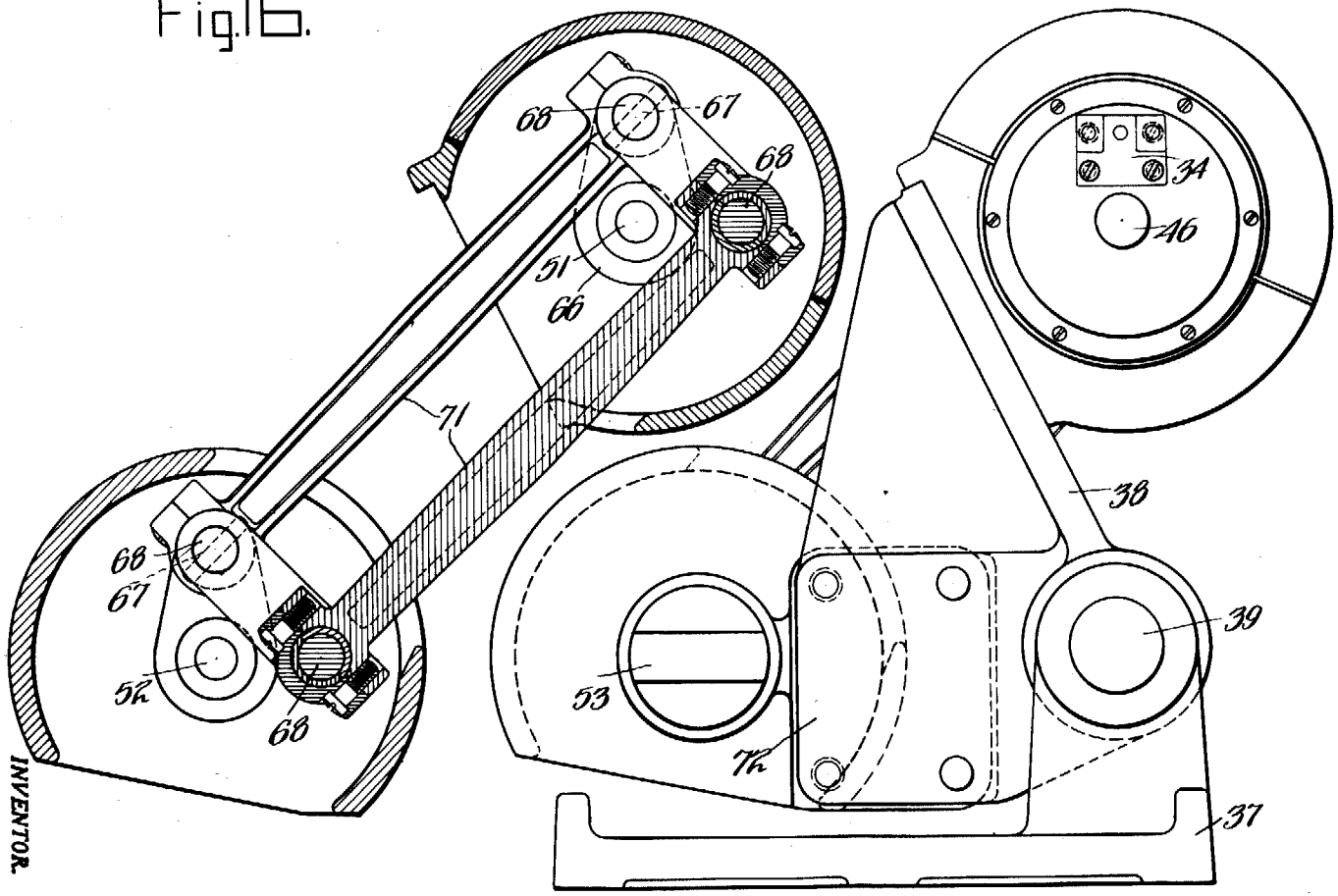
INVENTOR.
R. K. ROWELL.
BY E. W. Bedford
ATTORNEY.

AUTOMATIC CAM GRINDING MACHINE
Original Filed March 6, 1926 14 Sheets-Sheet 11
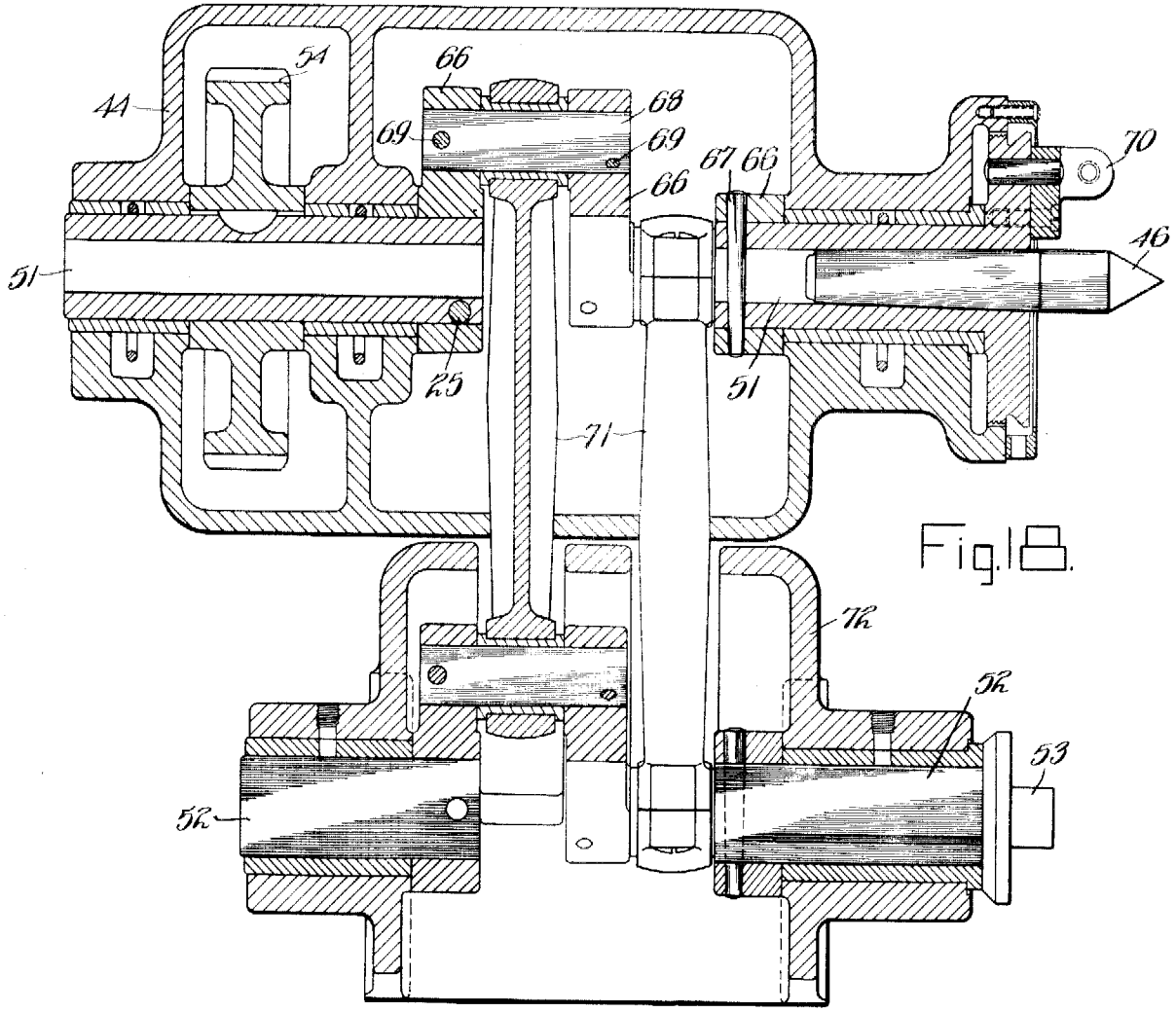
INVENTOR.
R. K. ROWELL.
BY E. B. Bradford
ATTORNEY.

AUTOMATIC CAM GRINDING MACHINE

Original Filed March 6, 1926 14 Sheets-Sheet 12

INVENTOR.
R. K. ROWELL.
BY E. E. Bradford
ATTORNEY.

AUTOMATIC CAM GRINDING MACHINE

Original Filed March 6, 1926 14 Sheets-Sheet 13

INVENTOR.
R. K. ROWELL.
BY
ATTORNEY.

AUTOMATIC CAM GRINDING MACHINE

Original Filed March 6, 1926 14 Sheets-Sheet 14

INVENTOR.
R. K. ROWELL.
BY E. W. Bradford
ATTORNEY.

Reissued Aug. 6, 1935 Re. 19,663

UNITED STATES PATENT OFFICE 19,663

AUTOMATIC CAM GRINDING MACHINE

Ralph K. Rowell, West Hartford, Conn., assignor to Landis Tool Company, Waynesboro, Pa., a corporation of Pennsylvania Original No. 1,675,466, dated July 3, 1928, Serial No. 92,885, March 6, 1926. Application for reissue May 26, 1930, Serial No. 455,936

66 Claims. (Cl. 51—101)

My said invention relates to an automatic cam grinding machine and it is an object of the same to provide means whereby an entire cam shaft can be finished to size without any attention from the operator other than that required in starting and stopping the machine.

Another object is to provide means for rotating the master cam and the work in synchronism.

Another object is to provide a means for automatically feeding the wheel into the work at the proper speed and withdraw it when the work is finished.

Another object is to provide means whereby the carriage is moved automatically from a finished cam to the next blank as each cam is finished, is stopped when the next blank is in front of the wheel, and is manually returned to the starting position when the entire camshaft is finished.

Another object is to provide improved means for reciprocating the wheel spindle in a line parallel with the carriage so as to give a smooth even finish to the work and also to reduce wheel wear.

Figure 1:
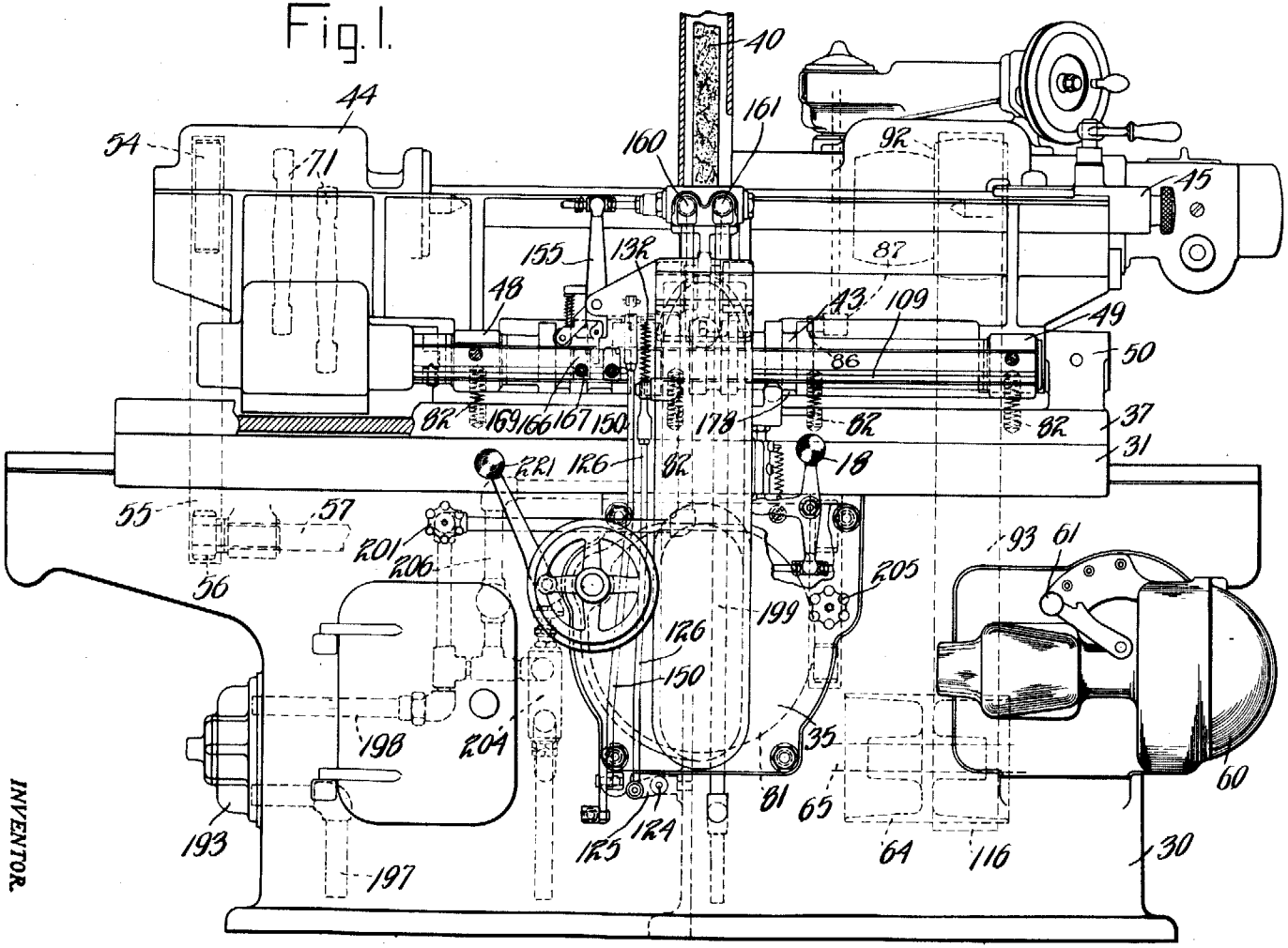
Figure 2:
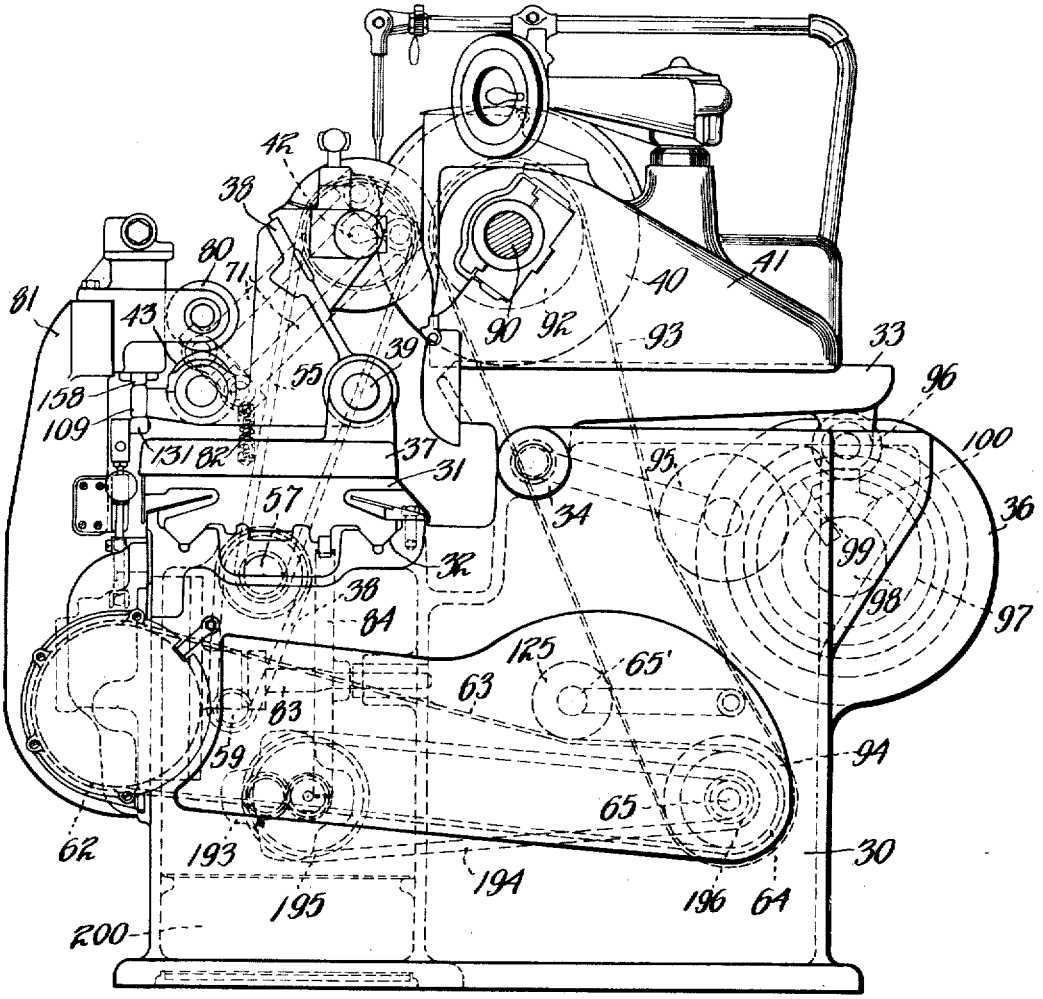
Figure 3:
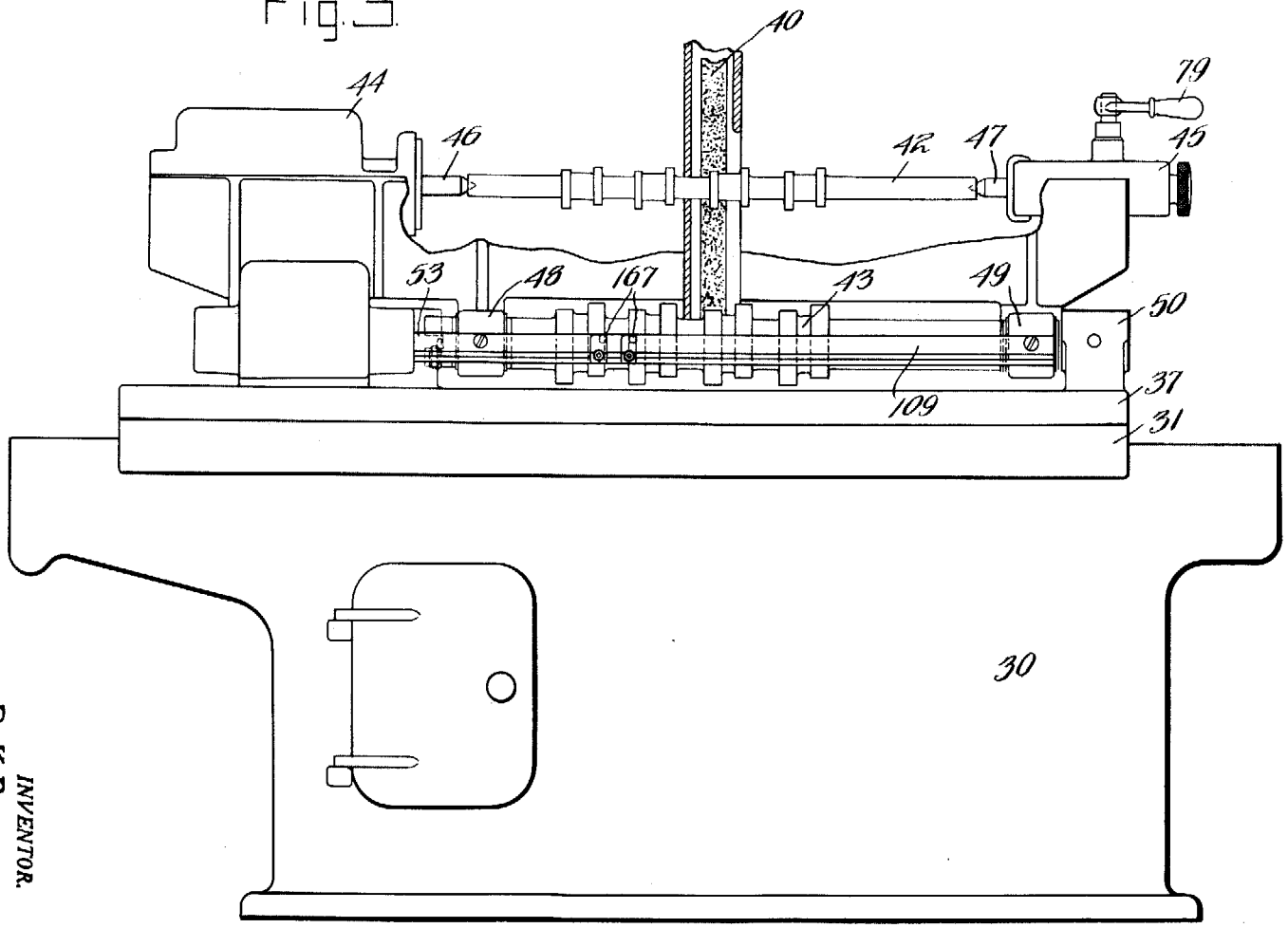
Figure 4:
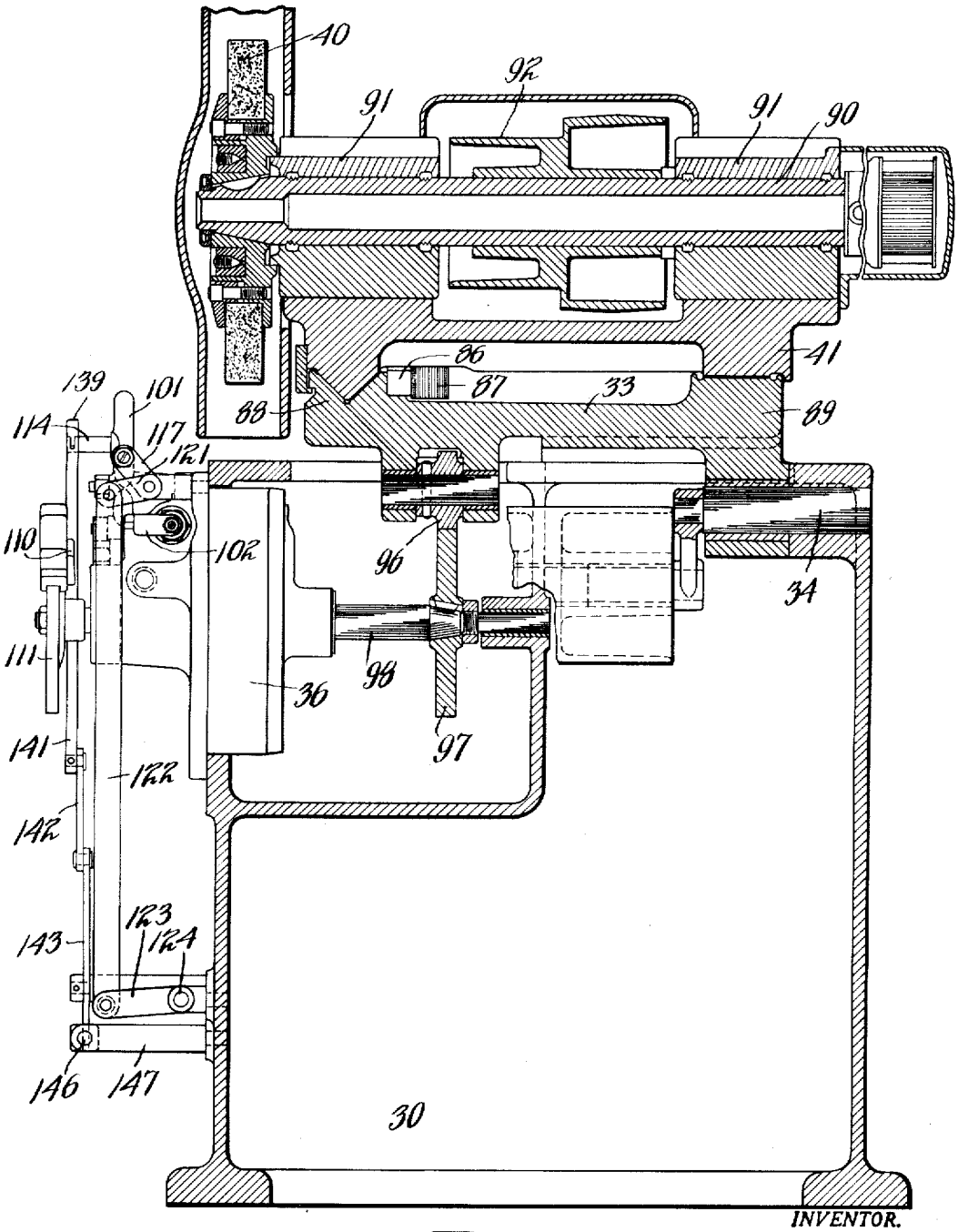
Figure 5:
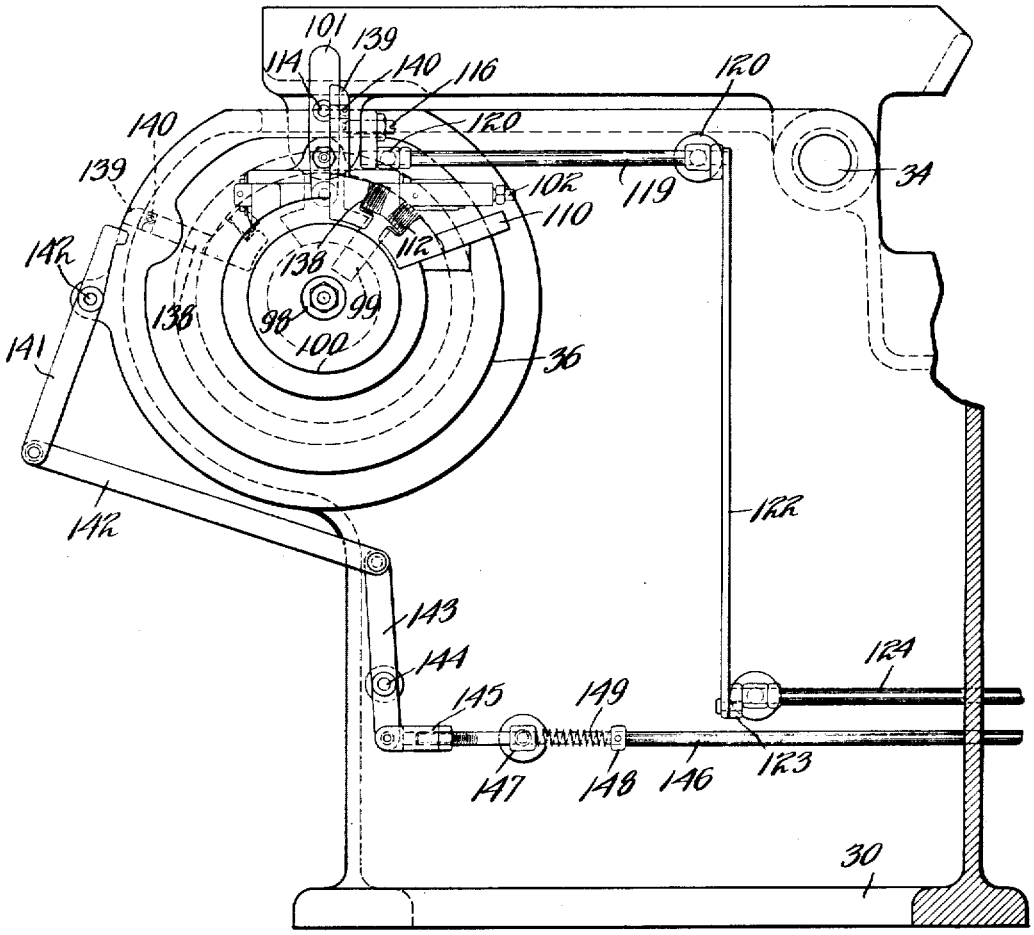
Figure 7:
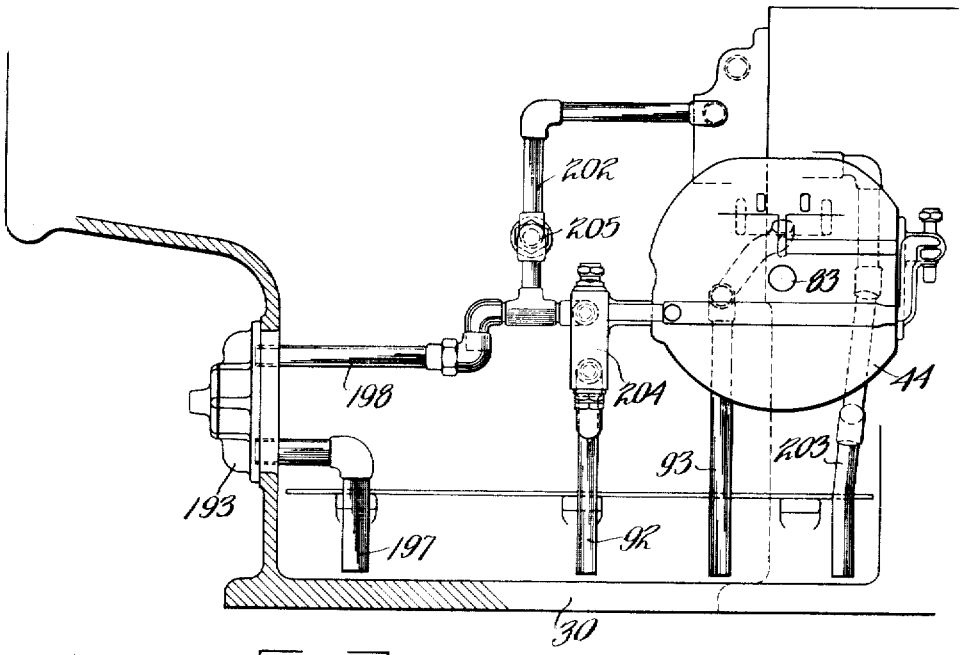
Figure 6:
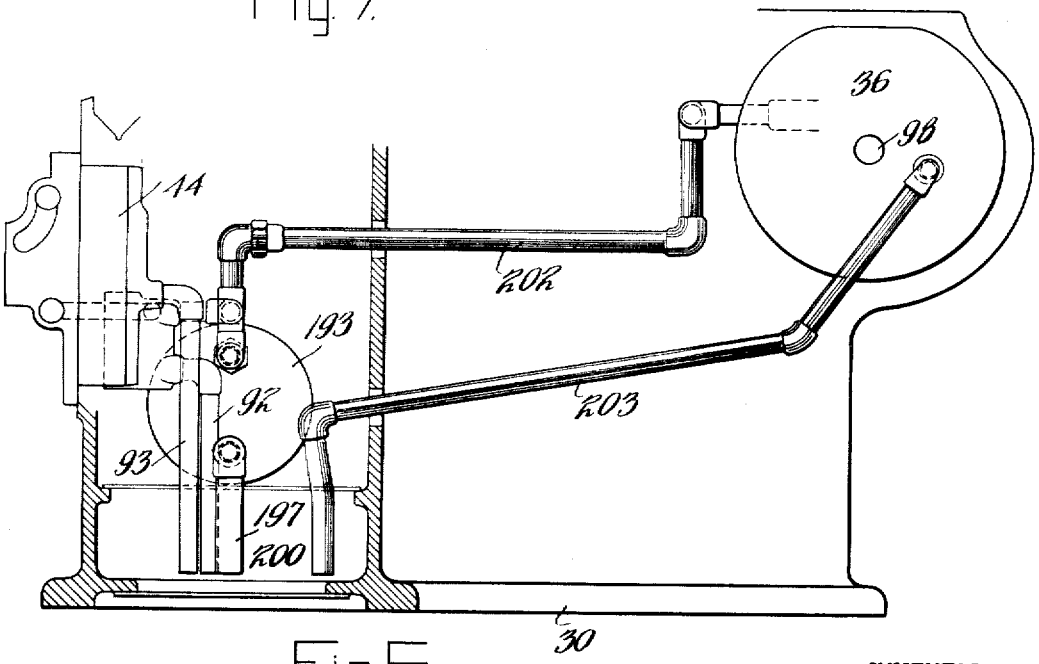
Figure 11:
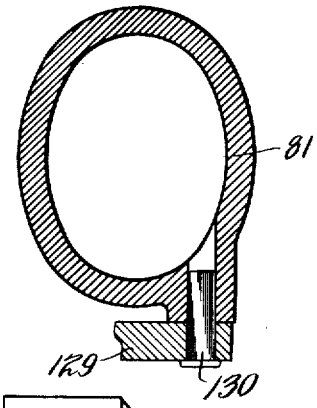
Figure 10:
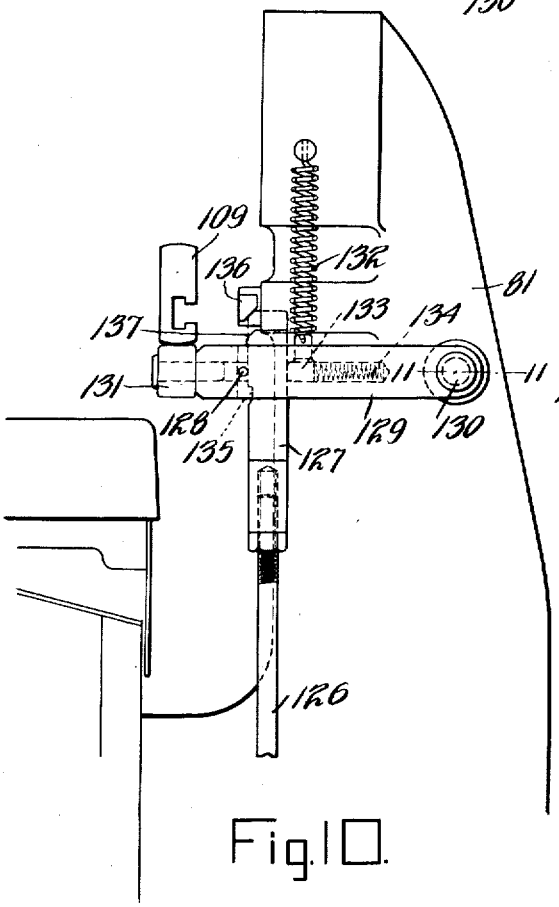
Figure 12:
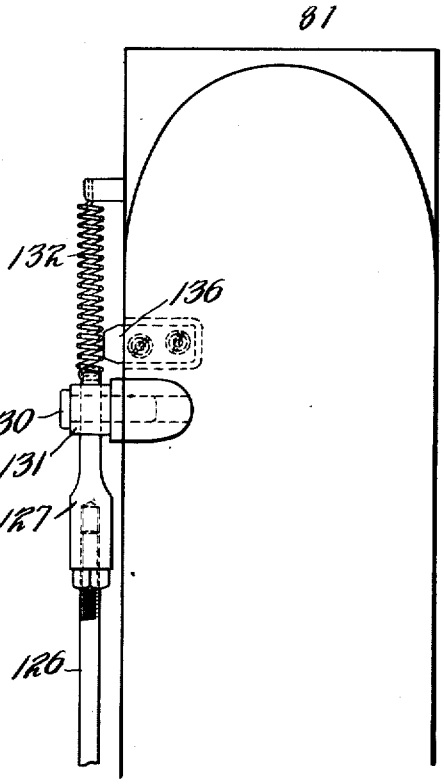

Referring to the accompanying drawings which are made a part hereof and on which similar reference characters indicate similar parts, Fig. 1 is a front elevation of the machine of my invention, Figure 2, an end elevation of said machine viewed from the right, Fig. 3, a front elevation showing the relative position of the master cam and the cam shaft which is being ground, Fig. 4, a partial longitudinal section of the wheel base and the part of the bed on which it rests, Fig. 5, an end elevation of the rear part of the bed viewed from the left and showing the wheel feeding motor, Fig. 6, an end elevation partly in section showing the piping for the wheel feeding motor as seen from the right in Fig. 1, Fig. 7, a front elevation partly in section showing the oil pump and the piping to both the wheel feeding motor and the traverse motor, Fig. 8, an end elevation of part of the traversing mechanism for the grinding wheel carriage, Fig. 9, an elevation of the valve operating lever used on the carriage traversing mechanism, as seen from the left in Fig. 1, Fig. 10, an elevation of a part of the mechanism for automatically controlling the movement of the wheel base, as seen from the left in Fig. 1, Fig. 11, a horizontal section of said mechanism on line 11—11 in Fig. 10, Fig. 12, a front elevation of said mechanism, Fig. 13, a right elevation of the foot stock, Fig. 14, a front elevation of said foot stock, Fig. 15, a plan of said foot stock, Fig. 16, a right elevation of the head stock partly in section showing the method of rotating the work and the master cam in unison.

Figure 20:
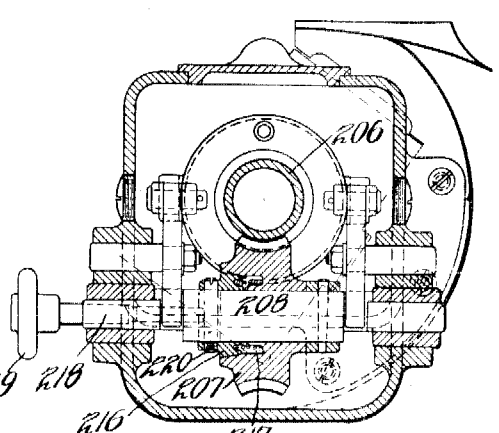
Figure 21:
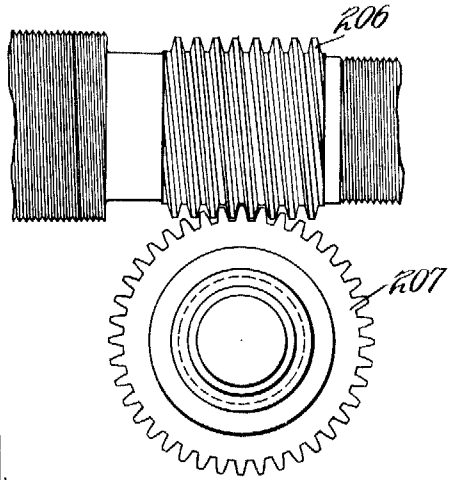
Figure 19:
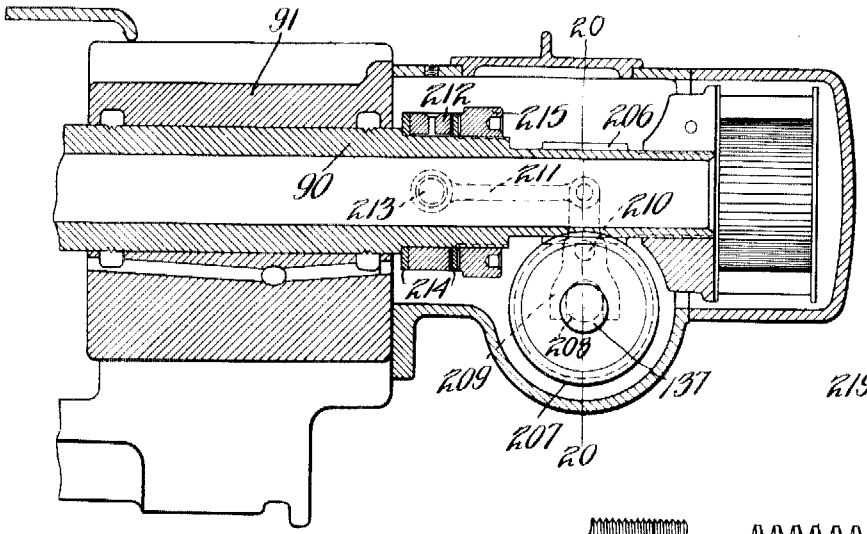
Figure 22:
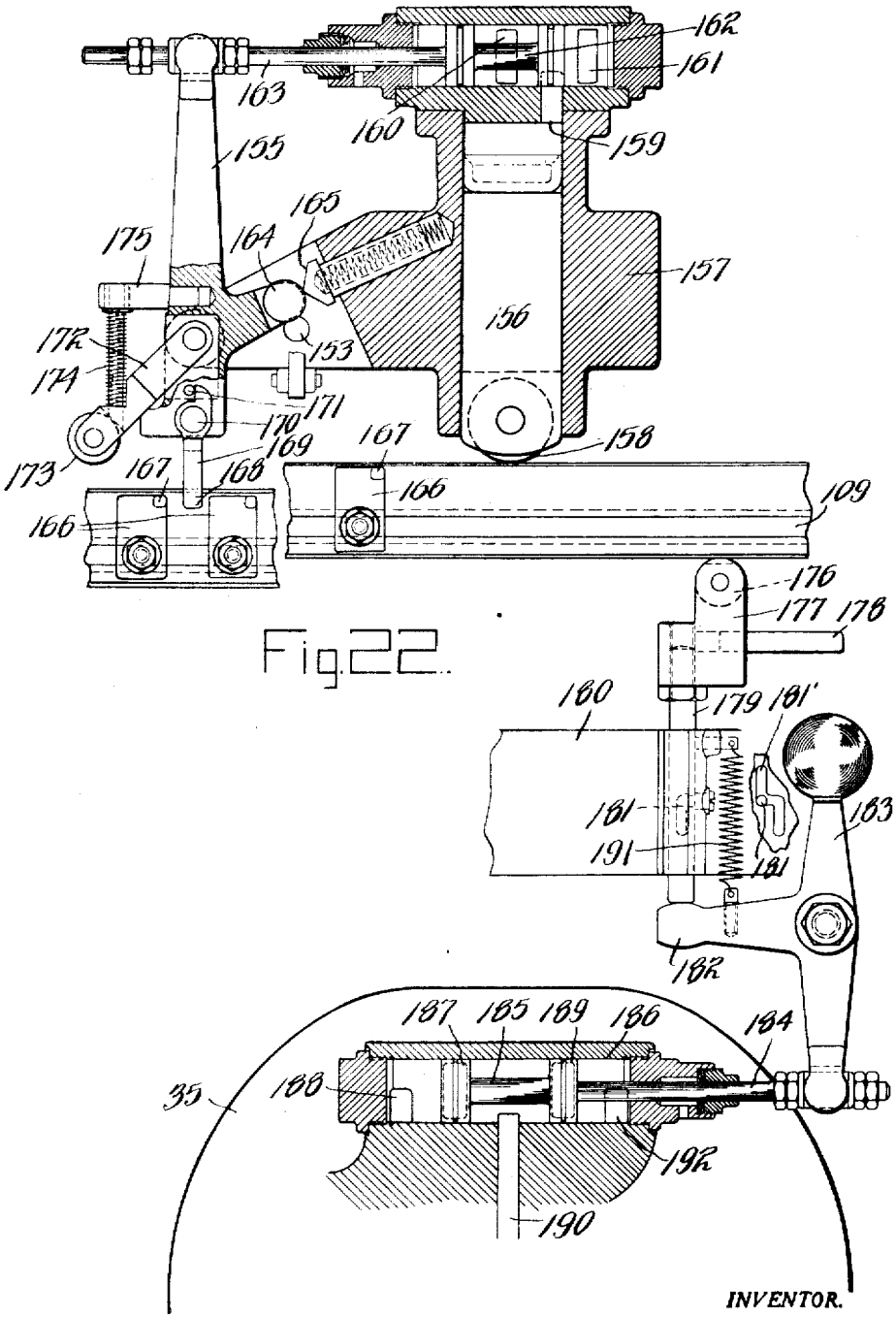
Figure 24:
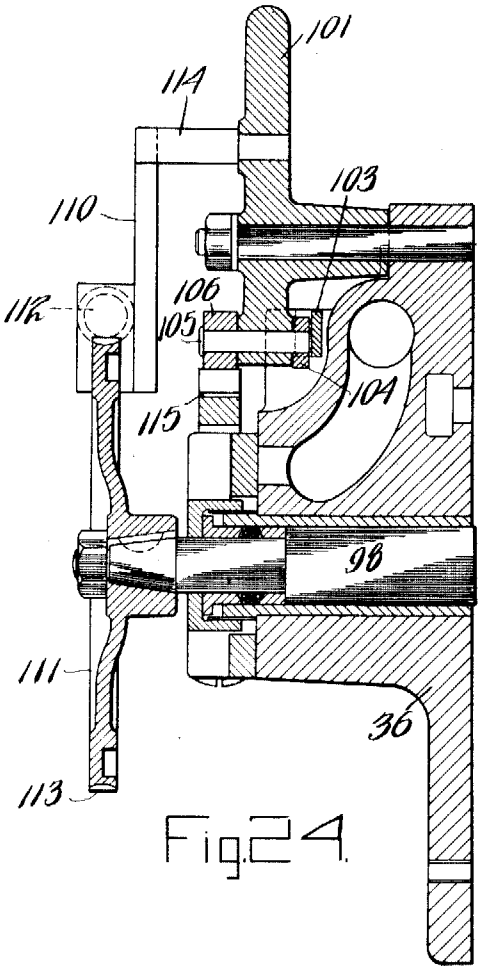
Figure 23:
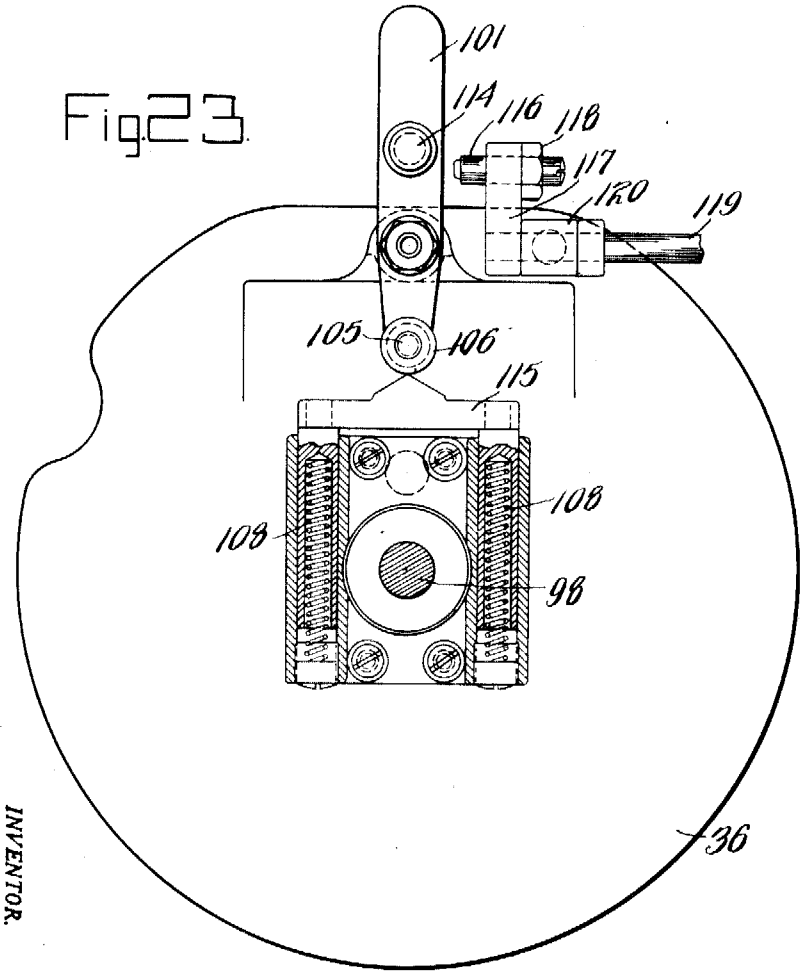

Fig. 17, a right hand elevation of the head stock illustrating means for swinging the work toward and away from the wheel so as to grind the cam to the desired shape, Fig. 18, a longitudinal section of the head stock, Fig. 19, a longitudinal section of the wheel spindle showing means for reciprocating the same, Fig. 20, a cross-section on line 20—20 of Fig. 19, Fig. 21, a detail of gearing shown in Fig. 19, Fig. 22, a front elevation partly in section of the valve for the traverse motor and the mechanism for operating said valve automatically to start and stop the traverse mechanism, Fig. 23, a front elevation of the wheel feed motor, and Fig. 24, a vertical longitudinal section of said motor.

In the drawings reference character 30 indicates the fixed bed of the machine which bed supports a work-carriage 31 mounted on guides 32 for reciprocation lengthwise of the machine. The bed also supports a slide base 33 pivoted near its front end at 34 for movement toward and from the work located on the carriage 31 in front of the slide base. The bed further supports a fluid motor 35 by means of which the work carriage is moved to and fro on the guides 32, a wheel feed motor 36 for moving the slide base 33 on its fulcrum 34 and various driving and controlling mechanisms hereinafter described.

*Work supporting and driving means*

The work carriage 31 bears a table 37 upon which a work supporting bracket 38 is mounted by pivots 39 for movement toward and from a wheel 40 on a wheel base 41 slidingly supported on the slide base 33 for adjustment toward and from the work, as to set the wheel and to compensate for wear. The bracket 38 and parts carried thereby are roughly triangular in cross section with the work 42 supported at one corner of the triangle, the master cam shaft 43 at another corner and the pivots 39 at the third corner. The position of the work is determined by a headstock 44 and a footstock 45 carrying respectively centers 46 and 47. The position of the master camshaft is determined by a coupling 48 at one end and a coupling 49 at the other end supported in the bearing 50.

Details of the headstock are shown in Figs. 16 to 18 together with driving means connecting the headstock spindle 51 to a crankshaft 52 which is connected by means of a lug 53 (Figs. 3 and 17) on the coupling 48 to the camshaft. The headstock spindle is driven by a sprocket 54 (Fig. 18) connected by a chain 55 to a sprocket 56 on the work drive shaft 57 (Figs. 1 and 2) which in turn is driven by a chain 58 from the change speed shaft 59 operated at various speeds by change speed gearing in a casing 60, the speed being varied by means of a hand-lever 61. The drive shaft of the change speed gearing carries a pulley 62 driven by a belt 63 from a work drive pulley 64 on the main shaft 65, and provided with a belt tightening idler 65'. The headstock spindle is divided into two parts spaced from one another and provided with cranks 66 secured to the respective sections by means of dowel pins 67, said cranks carrying crank pins 68 fastened to the cranks by dowel pins 69. An intermediate crank 66 is secured to the adjacent ends of the first-named crank pins in similar manner. A work driver 70 is secured to the face plate of the inner spindle section adjacent the center 46.

The crankshaft 52 is provided with cranks and crankpins held together in similar manner to the parts described in connection with the spindle 51. Connecting rods 71 have bearings at opposite ends mounted on adjacent bearings of the crankpins, these connecting rods being arranged parallel to one another in well-known manner and serving to provide a smooth and uniform drive from the headstock spindle to the crankshaft 52 and hence to the master camshaft 43. It may be noted that the bracket 72 enclosing the crankshaft 52 and providing bearings for the same is separate from the main bracket 38 and secured thereto by dowel pins and bolts but this is optional.

The footstock of the work-supporting mechanism is shown in detail in Figs. 13, 14, and 15. This footstock comprises a center 47, a dust-cap 73, a tension nut 74 for the spring 75 pressing against the rear end of the spindle 76, a pinion 77 having spur teeth meshing with rack teeth on the spindle, a pinion shaft 78 and a handle 79 by means of which the footstock center can be retracted for convenience in dismounting and replacing the work.

The master camshaft is provided with a series of cams corresponding in position to those on the camshaft to be ground while the whole camshaft to be ground may be provided only with roughly shaped cam blanks which must be ground down to suitable shape. For oscillating the brackets 38 to move the cam blanks toward and from the wheel during grinding operations I have provided a roller 80 mounted in fixed relation on a support secured to an upwardly projecting cover 81 for the traverse motor which cover is fixed in relation to the base or bed 30. The bracket is forced upward by springs 82 (Figs. 1 and 2) into a position where one of the cams of the master camshaft will rest against the periphery of the roller 80. It will be clear from the foregoing that as the master camshaft rotates in synchronism with the camshaft being operated on the bracket 38 will be oscillated on its fulcrum 39 to move the work toward and from the grinding wheel in a manner to govern precisely the shaping of the successive cams. When the work on a cam is completed the carriage is caused to travel a sufficient distance in one direction, e. g. to the left, to bring the next cam blank into operative relation to the wheel. For thus traversing the carriage I have provided a means comprising the fluid motor 35 of which certain details are shown in Figures 1 and 22 and which may be understood to be otherwise of any suitable type preferably having a vane mounted for oscillation between two fixed abutments in a chamber provided with means for admitting fluid alternately at opposite sides of the vane. The motor drives a shaft 83 carrying a pinion 84 whose teeth are in mesh with those of a rack 85 at the under side of the carriage.

*Grinding wheel feed*

It will be recalled that the grinding wheel is carried by a wheel base or wheel slide 41 mounted on a slide base 33 pivotally supported at 34. For the purpose of adjusting the wheel base along the slide base the slide base is provided with a rack 86 coacting with a pinion 87 on a vertical shaft in the wheel base and rotation of the vertical shaft causes the wheel base to move along guides 88, on the slide base. The wheel spindle 90 is journaled in bearings 91 on the wheel base 41 and the spindle is driven by means of a pulley 92 over which passes a belt 93 driven by a pulley 94 on the main shaft 65. This belt is kept tight by an idle pulley 95 on a bracket pivoted at 34.

The wheel base and the slide base are tilted about their common axis 34 for moving the wheel toward the work to compensate for the decreasing diameter of the work by means comprising a roller 96 (Figs. 2 and 4) underneath the rear end of the slide base resting on a cam 97. The cam 97 is splined to the shaft 98 of the wheel feed motor, such motor being hereinafter referred to as the wheel feed motor. This motor has a vane 99 on the shaft 98 arranged for oscillation in a chamber containing an abutment 100 which limits the movement of the vane and through which abutment fluid may be admitted to move the vane in one direction or the other thus rotating the cam 97 correspondingly. A reversing lever 101 controls the fluid admission valve 102 of the motor which may be any suitable type and is preferably slidable in a right line. A slide 103 (Fig. 24) is connected by a roller 104 and a pin 105 to the lever 101 for operating the valve. The pin also carries a roller 106 bearing on a detent 115 supported at opposite ends by springs 108 so as to force the lever 101 toward one or the other extreme of its movement. One purpose of this construction is to cause the wheel to retreat quickly from the work when a cam is finished.

*Automatic controlling means*

In order that the traverse may be made without injury to the wheel or the work it is necessary that one or the other be moved so far from the other in a direction respectively forward or back as to avoid any danger of the work striking the wheel during the traverse. With this object in mind I have provided interconnected controlling means for the work carriage and the wheel feed including means adapted to act on a forward projection or roller bar 109 of the bracket 38 in a manner to impart an abnormal swinging movement to the bracket in a direction for retracting the work from the wheel. This mechanism is illustrated in detail in Figs. 4, 5 and 8 to 12.

A dog 110 is mounted on the periphery of a dog-wheel 111 and is adjustable about such periphery by means of a worm 112 having threads engaging teeth indicated at 113 on the outer rim of the wheel. This dog is adapted to strike a lug 114 on the lever 101, as the work feed motor moves clockwise in Fig. 5, for swinging the lever until the roller 106 passes the point of the detent 115 whereupon the springs immediately force the lever over the remainder of the path of its movement and reverse the motor. Under circumstances hereinafter described the lever 101 will be held from moving clockwise to the required extent for reversing the movement of the wheel feed motor by means comprising a stop 116 in the path of movement of the lever. The stop 116 is adjustable longitudinally through a rockarm 117 and is provided with a lock nut 118 for locking it in adjusted position. The rockarm 117 is mounted on a rod 119 which is adapted to oscillate in bearings 120. At the front end of the rod 119 a rockarm 121 is provided which rockarm is connected by a link 122 to another rockarm 123 on a rockshaft 124 extending forward through the bed of the machine, or to the right in Fig. 5. At its forward end the shaft carries a rockarm 125 (Fig. 1) connected by a link 126 (Figs. 1, 10 and 12) to a rack 127 adapted to engage a pin 128 on a rockarm 129 pivoted at 130 on a cover 81 and provided at its forward end with a roller 131 contacting with the roller bar 109 (Figs. 10 and 22) at the front end of the bracket 38. A spring 132 draws the arm 129 toward its uppermost position and a plunger 133 forced rearwardly by a spring 134 tends to move the hook 135 into engagement with the pin 128 on said arm. A fixed abutment 136 (Figs. 10 and 12) on the cover 81 has a cam face cooperating with a cam face at 137 on the hook 135 to disengage the same from the pin 128 when the parts are lifted sufficiently high by spring 132.

The dog-wheel 111 or other part moving therewith also carries a dog 138 adjustable about the periphery of the dog-wheel by a screw 138', said dog having a nose 139 pivoted at 140 for engagement with a lever 141 (Figs. 4 and 5) pivoted at 142. The dog 138 acts on said lever as the traverse motor moves in a clockwise direction (Fig. 5) to trip the parts operated by said lever the pivotal mounting of the nose permitting the dog to pass the lever in the contrary direction of movement of the traverse motor without changing its position. As here shown the dog moves from the solid line position of Fig. 5 to the dotted line position. The lever 141 is connected by a link 142 to a lever 143 pivoted at 144 and this in turn is adjustably connected at 145 to a rod 146 slidably mounted in a bearing 147 and carrying a collar 148. A spring 149 surrounds the rod said spring bearing at one end against collar 148 and at the other against bearing 147 and serving to move the rod and the parts connected therewith normally to the right in Fig. 5 or toward the front of the machine. At its forward end the rod 146 is connected by suitable means such as a bent lever to an upright rod 150 (Figs. 1 and 8) which in turn is connected at its upper end by a bent lever 151 pivoted at 152 to a slidable detent 153 impelled by a spring 154 in a direction to engage under a lateral arm of a lever 155 (Fig. 22).

The piston 156 is slidably mounted in a cylinder 157 formed in the cover 81 and is provided at its lower end with a roller 158 engaging the upper face of the roller bracket 109. At its upper end the chamber 157 has a single port 159 opening into a valve chamber provided with an inlet port 160 (Figs. 1 and 22) and an exhaust port 161. A balanced piston valve 162 is located in said valve chamber and said valve has a stem 163 adjustably connected to the lever 155 with provision for lost motion. The lever 155 has a vertical arm and a laterally extending inclined arm provided at its outer end with a roller 164. A double-acting spring-pressed plunger 165 is mounted approximately in line with said arm so as to force the lever toward its extreme position in either direction of its movement. It will be seen that the detent 153 and the plunger 165 will hold the lever 155 and the valve 162 in the position indicated, so that piston 156 will not move until the detent 153 is retracted. When this occurs the plunger 165 will force the roller 164 downward and move the valve so as to connect the port 159 to the inlet port 160 whereupon the fluid will enter the piston chamber and force the piston down thereby moving the bar 109 downward to tilt the work supporting bracket 38 away from the wheel.

It will be recalled that the work carriage has a step-by-step or intermittent traversing movement for moving the camshaft so as to bring its successive cam blanks into the field of operation of the grinding wheel 40 and such movement is availed of for the purpose of returning the work carriage bracket to working position. For this purpose the traversing roller bar is provided with dogs 166 having forwardly projecting lugs 167 (Figs. 8, 9 and 22). The lever 155 is also provided with a depending finger 169 terminating in a rearwardly projecting lug 168 adapted to cooperate with the lugs 167 in one position thereof (Fig. 9). The finger 169 is pivoted on the lever at 170 in such a manner as to swing to one side in one relative direction of movement of the roller bar and the lever thus avoiding injury to the relatively movable parts. A pin 171 limits the swinging movement of the finger in a counterclockwise direction. The lever 155 has a rockarm 172 pivoted thereon, with a roller 173 adapted to contact with the roller bar 109 as it rises. A spring 174 provides a yielding connection between the rockarm 172 and a rigid finger 175, thus cushioning the action of the roller bar on the lever and the valve 162.

It will be seen from the foregoing that when the detent 153 is withdrawn the lever 155 will be moved clockwise by the plunger 165 so as to open the intake passage 160 to the chamber 157 and thus force the bar down so as to bring its lugs 167 to the level of the lug 168 on the finger 169. As bar 109 now moves to the right in Figure 22 with the work carriage, the appropriate lug 167 will strike the lug 168 (it being understood that the number of dogs 166 corresponds to the number of cam blanks on the cam shaft 42). The movement of the carriage will now cause the lever to swing on its pivot in a counterclockwise direction and this will move the balanced valve so as to shut off the intake port 160 from the port 159 and open a passage from outlet port 161 to port 159. At the same time the spring-pressed plunger 165 is permitted to return into holding position relative to the lever 155.

The movements above described, initiated by engagement of dog 138 with lever 141 in Figure 5 are utilized to govern the operation of the traverse motor. When the bar 109 is forced down by the pressure in the cylinder 157 it acts on a roller 176 (Figs. 8 and 22) on a roller bracket 177 provided with a handle 178. The roller bar is supported on a plunger 179 guided for up and down movement in a plunger bracket 180 on the cover 81, the movement of the plunger being limited by a stop 181 engaging at its inner end in a slot having parallel vertical branches 181′ connected by a horizontal cross-over portion. At its lower end the plunger bears on a laterally extending arm 182 of a three-armed lever 183, the lowermost arm of which is connected to the stem 184 of a balanced piston 185 in a chamber 186 which piston controls the operation of the oscillatory traverse motor 35. It has not been deemed necessary to illustrate details of this motor as it is of well-known type and is shown in other pending applications.

As the roller bar 109 pushes the plunger 179 down and moves the lever 183 counterclockwise the valve 185 uncovers a port 187 leading to an expansion chamber at one side of the vane of the traverse motor and admits fluid under pressure through an intake port 188 to said expansion chamber. Such movement of the valve also opens a passage from the port 189 to the outlet passage 190 of the motor for escape of fluid from the non-working side of the motor. The contrary movement of the roller bar and plunger permits a spring 191 to move the lever 183 in a clockwise direction thus moving the valve 185 to the left to an extent sufficient only to bring the valve into the position illustrated in Figure 22 where the entrance of liquid to either side of the motor, i. e., to either of its two opposed expansion chambers, is prevented and thus any traversing movement of the carriage during grinding is prevented.

When an entire camshaft has been completed and has been replaced by a new one the carriage must be returned to its original or starting position and for this purpose the handle 178 is turned to the left sufficiently to disengage the pin 181 from the shoulder between the branches 181′ of the slot in which the pin moves. The plunger 179 may now rise to the full extent of its movement and the lever 183 may consequently be moved in a counter-clockwise direction by the spring 191 to such an extent as to open a passage from the inlet port 192 to the port 189 for moving the motor in a direction to return the work carriage to its original position. At the same time the valve opens a way from the port 187 to the outlet 190 to permit escape of fluid from the non-working side of the traverse motor.

*Pump*

The device of my invention is provided with a rotary pump 193 driven by a sprocket chain 194 passing over a sprocket 195 on the pump shaft and a sprocket 196 on the main shaft of the machine. The pump has an intake 197 and a pipe 198 communicating with the inlet ports 188 and 192 of the traverse motor and also with the inlet port 160 for the piston chamber 157. An exhaust pipe 93 returns the exhaust fluid from the ports 189 and 187 of the traverse motor and a pipe 199 returns exhaust fluid from the exhaust port 161 of the piston chamber to the reservoir 200 at the bottom of the machine. A manually operated valve indicated at 205 in Fig. 1 serves to vary the supply of pressure fluid to the traverse motor when desired. A pipe 202 leads from the pipe 198 to the wheel feed motor 36 and an exhaust pipe 203 brings back the exhaust fluid from said motor to the reservoir 200. A valve 204 is normally spring-pressed to closed position. This valve provides a means whereby the operator can permit the fluid to return temporarily to the reservoir without operating the motor and the valve may also provide for relief of excessive pressure so that the speed of the pump need not be changed, nor need the pump be stopped because of temporary cessation of the operation of the machine. The valve is opened by the operator through the aid of the lever 221.

*Wheel traverse*

It is found desirable to give a limited traverse to the grinding wheel for reducing the wear on the wheel as much as possible and to give a smooth even finish to the work. For this purpose the grinding wheel spindle 90 is provided with a worm 206 meshing with teeth on a pinion 207 which is loose on a shaft 208. The shaft has eccentric portions at each end engaging forks in levers 209 pivoted at 210. These levers are connected by means of links 211 to a bronze collar 212 surrounding the shaft, said forks being pivoted to the collar at 213. The collar is held against endwise movement on the shaft by means of a pair of washers 214, the washer at the left resting against a shoulder on the spindle and the washer at the right being held in place by a nut 215. The gear 207 is caused to rotate with the shaft 208 by means of a clutch member 216 engaging a clutch face on the gear. A coiled spring 217 tends to separate the clutch faces and a screw 218 having an outer hand wheel 219 bears at its inner end against a pin 220 which is mounted at its ends in the clutch member 216 so that rotation of the hand wheel moves said clutch member into engagement with the worm gear.

It will be seen that rotation of the spindle and the wheel will turn the worm gear 207 and the eccentrics rotating therewith thus swinging the levers 209 through their connections to the collar 212 moving the shaft endwise to a limited extent. This reciprocating motion may be stopped by separating the clutch member 216 from the worm gear through the medium of the hand wheel 219 and screw 218.

*Operation*

In the operation of my device a camshaft is placed between the work centers, as indicated in Figure 3, the work carriage having been previously brought to its position farthest to the right so as to begin operations on a cam blank. The starting lever 221 is now moved to the right to open the valve 204 and fluid under pressure passes to the traverse motor, power being also applied to the wheel in ordinary manner. The wheel feed motor rotates the cam 97 in a counter-clockwise direction as seen in Figure 5, or clockwise as seen in Figure 2, the headstock is driven as above described causing the bracket 38 to rock in accordance with the contour of the master cam on the camshaft 43 and the operation proceeds in ordinary manner until the cam is ground to the desired size at which time the dog 138 strikes the pin 114 on lever 101 and swings the lever in a counterclockwise direction to a position in which the upper end of the lever moves to the left of the position shown in Figure 5.

This shifting of the lever 101 to the left, as referred to above, positions the valve 102 so as to admit fluid to that side of the wheel feed motor, which will cause the motor to turn clockwise; that is, in a direction to lower the feed slide. The work carriage is now indexed and shifted to position the work for grinding the next cam. The clockwise movement of the wheel feed motor will cause the dog 138 to move from the dotted line position in a counterclockwise direction to the full line position where it will shift the lever 101 and again reverse the valve which reverses the motor and moves the grinding wheel away from the work. The pivoted end portion 139 of the dog permits the dog to pass the nose of the trip lever 141 without moving the same.

On the reverse movement of the motor the dog wheel is moved clockwise and such movement continues until dog 110 strikes pin 114 and moves lever 101 to the position indicated in solid lines in Figure 5 where it abuts against a stop 116 which prevents further movement of the lever for the time being and cuts off the fluid from both sides of the motor. Just prior to the attainment of this position by the dog 110, the dog 138 passed the nose of lever 141 in a clockwise direction and therefore moved said lever about its pivot 142. As a result of such movement the lever 141 acting through the train of connections 142, 143, 146, 150 and 151 retracts the latch 153 from lever 155 (Fig. 22). Thereupon the plunger 165 acts on the lever through the roller 164 to move the valve 162 to the right and permit pressure fluid to enter the cylinder 157, moving piston 156 so as to force roller bar 109 down and so set the traverse motor in operation to index the carriage by acting on arm 182 of lever 183. The lateral movement of the bar with the work carriage causes the next lug 167, which has now been lowered to the proper level, to strike lug 168 and tilt lever 155 out of the way of latch 153 which then is moved back to latching position by spring 154. At the same time the lever moves the valve 162 to stop the flow of pressure fluid and opens the way to outlet 161, thus permitting the piston 156 and the bar 109 to rise. As the bar rises the spring 191 moves the lever 183 and valve 185 so as to stop the traverse motor.

When the bar 109 is forced down it acts through roller 131 to lower lever 129 until pin 128 is low enough to be engaged by hook 135, when the hook is moved into engagement with said pin. As the bar rises the rod 126 is moved up and through the train of elements previously described, rocks shaft 119 to move stop 116 out of the way of lever 101 whereupon the lever moves further over under the pressure of detent 115 until it is in position to cause the motor to move in a clockwise direction to again raise the slide base and so repeat the cycle of operations. Thus the wheel cannot be moved toward the work until the traverse movement is completed.

It will be obvious to those skilled in the art that various changes may be made in my device without departing from the spirit of the invention, and I, therefore, do not limit myself to what is shown in the drawings and described in the specification, but only as set forth in the appended claims.

Having thus fully described my said invention, what I claim as new and desire to secure by Letters Patent, is:

1. In a cam grinding machine, a rotary wheel, a tilting support therefor, a bracket tiltable on an axis parallel to that of the wheel, means on said bracket for supporting a camshaft, and means including a master camshaft for tilting said bracket, and means for tilting said bracket away from the grinding wheel, substantially as set forth.

2. In a cam grinding machine, a rotary wheel, a tilting support therefor, a bracket tiltable on an axis parallel to that of the wheel, means on said bracket for supporting a camshaft, a master camshaft arranged parallel to the axis of said wheel, and a fixed follower on a fixed support coacting with the cams on the master camshaft for tilting the bracket, and means for tilting the said bracket away from the ginding wheel, substantially as set forth.

3. In a cam grinding machine, a rotary wheel, a tilting support therefor, a bracket tiltable on an axis parallel to that of the wheel, means on said bracket for supporting a camshaft, a master camshaft arranged parallel to the axis of said wheel, a follower on a fixed support coacting with the cams on the master camshaft for tilting the bracket, and resilient means serving to tilt the bracket and move the work toward the wheel, and additional means for tilting the bracket away from the grinding wheel, substantially as set forth.

4. In a cam grinding machine, a rotary wheel, a tilting support therefor, a work carriage, means on the carriage for supporting and rotating a camshaft, a cam for tilting the wheel supporting means, and an oscillatory fluid motor for driving said cam alternately in opposite directions, substantially as set forth.

5. In a cam grinding machine, a rotary wheel, a tilting support therefor, a work carriage, means on the carriage for supporting and rotating a camshaft, a cam for tilting the wheel supporting means, an oscillatory fluid motor for driving said cam alternately in opposite directions, a traversing work carriage, and means for moving with said motor for controlling the movements of the work carriage, substantially as set forth.

6. In a cam grinding machine, a rotary wheel, a tilting support therefor, a work carriage, means on the carriage for supporting and rotating a camshaft, a cam for tilting the wheel supporting means, an oscillatory fluid motor for driving said cam alternately in opposite directions, a traversing work carriage, means for moving the work carriage step-by-step to bring successive cams into the field of operation of the wheel, and means operated by said fluid motor for controlling the step-by-step movements of the carriage, substantially as set forth.

7. In a cam grinding machine, a rotary wheel, a tilting support therefor, a work carriage, means on the carriage for supporting and rotating a camshaft, a cam for tilting the wheel supporting means, an oscillatory fluid motor for driving said cam alternately in opposite directions, a traversing work carriage, a fluid motor for operating said carriage, and means operated by said first-named fluid motor for setting the second fluid motor in action at intervals to move the carriage intermittently in one direction, substantially as set forth.

8. In a cam grinding machine, a rotary wheel, a tilting support therefor, a work carriage, means on the carriage for supporting and rotating a camshaft, a cam for tilting the wheel supporting means, an oscillatory fluid motor for driving said cam alternately in opposite directions, a traversing work carriage, an oscillatory fluid motor for operating said carriage, and means controlled by the first-named fluid motor for putting the second-named fluid motor into and out of operation to move the carriage step-by-step in one direction, substantially as set forth.

9. A cam grinding machine comprising a rotary wheel, a traversing work carriage, a tilting bracket on the work carriage, means for moving the carriage intermittently to bring successive cams into the field of operation of said wheel, and means for tilting the bracket to prevent interference with said traversing movement including a fluid motor, substantially as set forth.

10. A cam grinding machine comprising a rotary wheel, a traversing work carriage, a tilting bracket on the work carriage, means for moving the carriage intermittently to bring successive cams into the field of operation of said wheel, means for tilting the bracket to prevent interference with said traversing movement including a fluid motor, wheel feeding means including a fluid motor, and means operated by the wheel feeding means in the extreme forward position of the wheel for setting the first-named fluid motor in action, substantially as set forth.

11. A cam grinding machine comprising a rotary wheel, a traversing work carriage, a tilting bracket on the work carriage, means for moving the carriage intermittently to bring successive cams into the field of operation of said wheel, means for tilting the bracket to prevent interference with said traversing movement including a fluid motor, wheel feeding means including a fluid motor, means operated by the wheel feeding means in the extreme forward position of the wheel for setting the first-named fluid motor in action, and automatic means for putting said motor out of action for a predetermined traverse of the work carriage, substantially as set forth.

12. In a cam grinding machine, a rotary wheel, a tilting support therefor, a work carriage, means on the carriage for supporting and rotating a camshaft, a cam for tilting the wheel supporting means, a fluid motor for driving said cam alternately in opposite directions, a traversing work carriage, means for moving the work carriage step-by-step to bring successive cams into the field of operation of the wheel, means operated by said fluid motor for controlling the step-by-step movements of the carriage, the said means comprising a reversing valve for said fluid motor, a bar mounted on said carriage, dogs adjustably secured to said bar, an arm operable by said dogs, and a valve movable to exhaust position by said arm whereby said reversing valve is permitted to return to inoperative position, substantially as set forth.

13. In a cam grinding machine, a rotary wheel, a tilting support therefor, a work carriage, means on the carriage for supporting and rotating a camshaft, a cam for tilting the wheel supporting means, a fluid motor for driving said cam alternately in opposite directions, a traversing work carriage, means for moving the work carriage step-by-step to bring successive cams into the field of operation of the wheel, means operated by said fluid motor for controlling the step-by-step movements of the carriage, the said means comprising a bar mounted on said carriage, dogs adjustably secured to said bar, a reversing valve, and operative connection between said dogs and said reversing valve to permit the return of said valve to inoperative position, substantially as set forth.

14. In a cam grinding machine, a rotary wheel, a tilting support therefor, a work carriage, means on the carriage for supporting and rotating a camshaft, a cam for tilting the wheel supporting means, a fluid motor for driving said cam alternately in opposite directions, a traversing work carriage, a fluid motor for operating said carriage, means operated by said first-named fluid motor for setting the second fluid motor in action at intervals to move the carriage intermittently in one direction, the said means comprising a dog wheel, an irreversible dog on said dog wheel, a retaining pin, operative connection between the said dog and the said retaining pin, the said operative connection being adapted to withdraw the retaining pin when the motor operates in one direction, a valve operating arm held in position by said pin, a spring pressed plunger for operating the said arm, a valve controlled by said arm, a piston operated by said valve, and a reversing valve operated by said piston, substantially as set forth.

15. In a cam grinding machine, a rotary wheel, a support therefor, a bracket tiltable on an axis parallel to that of the wheel, means on said bracket for supporting a camshaft, a master camshaft arranged parallel to the axis of said wheel, and a fixed follower on a fixed support coacting with the cams on the master camshaft for tilting the bracket, and means controlled by movement of the wheel support to its rearmost position for tilting the said bracket away from the grinding wheel, substantially as set forth.

16. In a cam grinding machine, a rotary wheel, a movable support therefor, a work carriage, means on the carriage for supporting and rotating a camshaft, a cam for moving the wheel supporting means, a fluid motor for driving said cam alternately in opposite directions, a traversing work carriage, and means moving with said motor for controlling the movements of the work carriage, substantially as set forth.

17. In a cam grinding machine, a rotary wheel, a movable support therefor, a work carriage, means on the carriage for supporting and rotating a cam shaft, a cam for moving the wheel supporting means, a fluid motor for driving said cam alternately in opposite directions, a traversing work carriage, means for moving the work carriage step-by-step to bring successive cams into the field of operation of the wheel, and means operated by said fluid motor for controlling the step-by-step movements of the carriage, substantially as set forth.

18. In a cam grinding machine, a rotary wheel, a movable support therefor, a work carriage, means on the carriage for supporting and rotating a camshaft, a cam for moving the wheel supporting means, a motor for driving said cam alternately in opposite directions, a traversing work carriage, a fluid motor for operating said carriage, and means operated by said first-named motor for setting the said fluid motor in action at intervals to move the carriage intermittently in one direction, substantially as set forth.

19. A cam grinding machine comprising a grinding wheel, a support therefor, a work carriage, automatically operable means for moving the carriage intermittently to bring successive cams into the field of operation of said wheel, a bracket tiltable on an axis parallel to that of the wheel, means on said bracket for supporting a camshaft, a master camshaft for tilting said bracket, and means for moving said wheel support toward the work, substantially as set forth.

20. A cam grinding apparatus comprising a grinding wheel and a cam blank support which are relatively movable towards and from each other, means including master cams to cause said relative movement to produce desired contours on various cam blanks, means to cause relative traversing movement between the wheel and cam blanks to position the wheel in operative relation with a given cam blank, and means to separate the wheel and the cam blank support before a new cam may be located in position opposite to the wheel.

21. A cam grinding machine comprising a grinding wheel and a support for cam blanks, said wheel and support being relatively movable towards and from each other, means including a set of master cams and a cam follower to cause such relative movement, manually controlled traversing mechanism to move the cam blank support to position the grinding wheel in front of the desired cam blank, and means including a fluid pressure mechanism to separate said grinding wheel and cam blank before a new cam may be located in position opposite to the wheel.

22. A cam grinding apparatus for cylindrical grinding machines comprising a grinding wheel, a table, mechanism to cause said table and wheel to be traversed one relative to the other, a pivotally mounted work support, means to rotate said work, means to rock said support during rotation of the work to produce the desired contour on said work and means including a fluid pressure mechanism to rock said support to an inoperative position before a new cam may be located in position opposite to the wheel.

23. A cam grinding apparatus comprising a work support adapted to present work in operative relation to a grinding wheel, means including a master cam and a follower arranged to move the work support relative to the wheel to grind a desired cam contour and a fluid pressure mechanism to move the cam and its follower out of operative contact.

24. A cam grinding apparatus comprising a grinding wheel and a support for a cam blank, one of which is movable relatively towards and from the other, means including a master cam and a follower to cause relative movement between the wheel and cam blank to grind the latter and fluid pressure mechanism to move the cam blank and wheel relatively into an inoperative position.

25. A cam grinding apparatus for cylindrical grinding machines comprising a pivotally mounted work support, a master cam and a follower, one of which is rotatably mounted on said support, means to rotate said cam, yieldable means to normally maintain said master cam in contact with said follower and a fluid pressure mechanism to rock said support to remove said master cam out of contact with said follower.

26. A cam grinding apparatus for cylindrical grinding machines comprising a table, means to traverse said table, a pivotally mounted work support on said table, a master cam rotatably mounted on said support, means to rotate said master cam, a master cam follower rotatably mounted on said table, yieldable means to normally maintain said master cam in contact with said follower, a fluid pressure piston and cylinder mechanism to rock said support to separate the master cam and follower and a valve mechanism to admit fluid under pressure to said cylinder.

27. A cam grinding machine comprising a grinding wheel, a support for a camshaft mounted to move the camshaft towards and from the wheel to grind a cam, means to move the wheel and the work support, one relative to the other, lengthwise of the camshaft, a set of master cams and a follower operatively associated with one of the master cams movable axially relative to one another, one of which is mounted on the support, means to rotate said master cams and camshaft in timed relation, the rotation of the master cams serving to move said support to produce a predetermined contour on the cam being ground, and means operated to move said master cams and follower successively out of contact and thereafter relatively to position the follower in operative relation with another master cam.

28. A grinding machine comprising a rotatable grinding wheel, a support for holding a piece of work in grinding position which is movable towards and from the wheel, mechanism to feed the wheel into the work and means operated in timed relation with said mechanism to move the work to an inoperative position when the wheel is also moved away from the work.

29. A grinding machine comprising a rotatable grinding wheel, a support for holding a piece of work in grinding position which is movable toward and from the wheel, mechanism to feed the wheel into the work and means operated in timed relation with said mechanism to move the work to an inoperative position when the wheel is moved away from the work and to return the work when the wheel is moved towards the same.

30. A cam grinding machine comprising a rotatable grinding wheel, a support for work having a plurality of surfaces to be ground, said support being movable both transversely and towards and from the wheel, means to move the support transversely to position one of the work surfaces opposite the wheel, fine precision mechanism to move the grinding wheel towards and from the work and means controlled by said mechanism to move the work to an inoperative position when the wheel is moved out of contact therewith.

31. A cam grinding apparatus for a cylindrical grinding machine comprising a rotatable grinding wheel, a work support, fine precision mechanism for feeding the grinding wheel towards and from the work, means including a mastercam and roller to move the work support towards and from the grinding wheel to grind the work to a desired contour and automatic means operating in timed relation with the rearward movement of the grinding wheel to separate the master cam from its roller.

32. A cam grinding apparatus comprising a rotatable grinding wheel, a support for a set of cam blanks, means including a set of master cams and a follower which are relatively movable to cause the cam blank to be ground to a desired contour, means to separate the grinding wheel and cam blanks, means for relatively traversing the grinding wheel and the cam blanks to position the wheel in front of a desired blank, and means operating in timed relation with the separation of the wheel and cam blanks to move the master cam automatically away from the cam followers so that it may be shifted longitudinally into operative relation with another cam corresponding with the new cam blank selected.

33. A grinding machine, comprising a rotatable grinding wheel, a work support movable toward and from the grinding wheel, means for moving the grinding wheel towards and from the work support, means for supporting a set of cam blanks on the support in operative relation with the grinding wheel, means including a set of master cams and a cam follower arranged to move the work support toward and from the grinding wheel to cause the latter to grind a desired contour on a cam blank, means for traversing the work support and the grinding wheel relatively longitudinally, means operated by the rearward movement of the grinding wheel to move the master cam away from the follower and means operated by the relative traversing movement of the wheel and work to move the master cam follower into position opposite to another cam.

34. A grinding machine comprising a rotatable grinding wheel, a support to hold a piece of work in rotative contact with the wheel, fine precision cross feed mechanism to move the wheel towards and from the work, and fluid pressure mechanism to move the work support and wheel relatively and independently of the cross feed mechanism.

35. A grinding machine comprising a rotatable grinding wheel, a work support movable towards and from the wheel, fine precision cross feed mechanism to move the wheel towards and from the work and fluid pressure mechanism to move the work support and the wheel relatively towards and from each other and independently of the wheel feed.

36. A grinding machine comprising a base, a slide thereon, a grinding wheel rotatably mounted on the slide, a work support movable towards and from the wheel, fine precision mechanism for moving the slide towards and from the work, and fluid pressure mechanism to move the work support towards and from the wheel.

37. A grinding machine comprising a base, a slide thereon, a grinding wheel rotatably mounted on the slide, a work support movable towards and from the wheel, fine precision mechanism for moving the slide towards and from the work, and fluid pressure mechanism automatically controlled by said precision mechanism to move the work support towards and from the wheel.

38. A grinding machine comprising a rotatable grinding wheel, a work support, a wheel feed mechanism to feed the grinding wheel towards and from said support, means to traverse said wheel and support relatively, means to rotate the work on said support, and fluid pressure mechanism operated in timed relation with said wheel feed mechanism to move said support away from the wheel to an inoperative position when the wheel is removed from the work.

39. A cam grinding apparatus comprising a rotatable grinding wheel, a work support movable toward and from the grinding wheel, fine precision mechanism for moving the grinding wheel toward and from the work support, means for holding a set of cam blanks on the support in operative relation with the grinding wheel, means including a set of master cams and a follower arranged to move the work support toward and from the grinding wheel as the work rotates to grind a desired contour on the work, and fluid pressure mechanism to move the work support toward and from an inoperative position as the grinding wheel is moved from and toward the work.

40. A grinding machine comprising a rotatable grinding wheel and a work support which are relatively traversable, means for feeding the grinding wheel toward and from the work control means for said feeding means, means for preventing the operation of the control means during the traversing movement of the work support, and means for preventing relative traversing movement between the wheel and the work during the grinding operation.

41. A grinding machine comprising a rotatable grinding wheel, a work support traversable longitudinally past the grinding wheel, a wheel feed mechanism for moving said wheel toward and from the work, and means to prevent traversing movement of the work during the grinding operation which is released automatically when moving the wheel away from the work.

42. A grinding machine comprising a rotatable grinding wheel, a work support, means for moving the grinding wheel towards and from the work support, means for traversing the work support longitudinally parallel with the grinding wheel axis, locking mechanism to prevent such traversing movement during the grinding operation and means effective upon moving the wheel away from the work to release such locking mechanism and permit the traversing movement of the work support.

43. A grinding machine comprising a rotatable grinding wheel, a work support arranged to traverse the work substantially parallel with the grinding wheel axis, a wheel feeding mechanism to move the grinding wheel toward and from the work, a locking device adapted to prevent longitudinal movement of the table during the grinding operation and fluid pressure mechanism controlled by the wheel feeding mechanism to release said locking means and permit traversing of the work support when the wheel has been removed from contact with the work.

44. A grinding machine comprising a rotatable grinding wheel, a work support movable towards and from the wheel, means to rotatably support a set of cam blanks thereon, means including a set of master cams and a cam follower adapted to move said support toward and from the wheel to grind a predetermined contour on one of the cam blanks, fine precision mechanism for feeding the wheel toward and from the work, means for traversing the work support and the grinding wheel relatively to position the grinding wheel in front of another cam blank, and locking mechanism to prevent such relative traversing movement except when the work is out of contact with the grinding wheel.

45. A cam grinding machine comprising a grinding wheel, a table, a pivotally mounted support for a set of cam blanks on said table, means to feed the grinding wheel towards and from the cam shaft to grind a cam, traversing mechanism to move said table lengthwise of said cam shaft to position a cam blank in operative relation with the grinding wheel, a set of master cams rotatably mounted on said support, a follower mounted on the table, means to rotate said master cams to rock said support and produce a predetermined contour on the cam being ground and automatic means actuated by turning said feed mechanism in one direction to lock the table against lengthwise movement during the grinding operation and to unlock said table and rock said support to an inoperative position when the feed mechanism is turned in the reverse direction.

46. A cam grinding machine comprising a base, a work table, means to traverse said table, a rocking support pivotally mounted on the table, a set of rotatable master cams and a cam follower, one of which is mounted on the table and the other on the base, means for supporting a set of cam blanks on the rocking support, means for rotating the master cams and the cam blanks in synchronism, a rotatable grinding wheel, fine precision mechanism for moving the grinding wheel toward and from the cam blank through a predetermined distance, and means operated automatically in timed relation with the wheel feeding mechanism to rock the said support to separate the master cams from the follower, substantially as set forth.

47. A machine for grinding a work piece which has an arc contour comprising a grinding wheel, a work supporting table, means for moving the grinding wheel and the work table relative to each other, a work support pivotally mounted on the work table having means for supporting the work to be ground, a pattern, a follower, one of said two last-named elements being mounted on the rocking support and the other on the base arranged to move the work toward and from the grinding wheel to grind the desired contour on the work, precision mechanism for moving the grinding wheel toward and from the work, and means operated by movement of the said last-named mechanism to separate the master pattern from its follower and to remove the work being ground from the position in which the grinding is carried on, substantially as set forth.

48. A cam grinding machine comprising a rotatable grinding wheel, a work supporting table, means to traverse the work supporting table and the grinding wheel relatively to each other in a longitudinal direction, a work support pivotally mounted on the table arranged to rotatably support a set of cam blanks, a set of master cams and a cam follower, one of which is mounted on the rocking support arranged to move the cam blanks toward and from the grinding wheel to cause the grinding wheel to grind a desired contour thereon, mechanism for feeding the grinding wheel toward and from the cam blanks, and means operated by movement of said mechanism to separate the master cam from its follower and to withdraw the cam blank from the normal position of grinding, substantially as set forth.

49. A cam grinding machine having a base, a rotatable grinding wheel movably mounted transversely of the base, a support for a cam shaft arranged to move the cam shaft longitudinally to bring cam blanks successively into operative relation with the grinding wheel, means for moving said support laterally toward and from the grinding wheel, means including a master cam and a cam follower to move the cam blanks and produce a predetermined contour thereon, means for locking the cam blank support against longitudinal movement and with a cam blank in any one of several operative positions relative to the grinding wheel, and means for releasing the locking means when the cam blank and grinding wheel are separated, substantially as set forth.

50. In a machine of the kind described, a work support, a wheel support, fluid means to provide relative transverse and longitudinal movement between said supports, and means operable upon movement of said wheel support to working position to prevent said longitudinal movement from taking place while the wheel is in working engagement with the work piece.

51. In a grinding machine, a work support, a wheel support, individual fluid means to move each of said supports, means to move said work support intermittently to successively present a plurality of work pieces to be ground, and means responsive to the means for moving the wheel support to set in motion the fluid to cause said intermittent movements.

52. In a grinding machine a bed, a work carriage mounted on said bed, a wheel support movable toward and from said work carriage, a work cradle mounted on said work carriage, means for moving the wheel support, and means responsive to movement of the wheel support for initiating movement first of the work cradle and then of the work carriage, substantially as set forth.

53. In a grinding machine, a work carriage, a wheel carriage, fluid means to provide relative transverse and longitudinal movement between said parts, means to effect one of said movements intermittently, automatic means to stop said movement at predetermined points and for a predetermined time and additional automatic means set in operation at the end of said interval to cause resumption of said movement.

54. In a grinding machine a bed, a wheel support, a work carriage, means for rotatively supporting the work piece on said carriage, means to provide a relative transverse and longitudinal movement of said wheel support and work carriage, means for locking the work carriage in any one of several predetermined positions for grinding work, and means for releasing the work carriage and causing its traverse only after the wheel support has been withdrawn to inoperative position, substantially as set forth.

55. In a machine of the kind described, a wheel support, a work support, separate fluid means to move each of said supports, the means to move one of said supports operating intermittently to successively bring a grinding wheel and a plurality of work pieces into operative relation, means actuated by one of said fluid means to determine the duration of the grinding operation.

56. In a grinding machine a bed, a work carriage, a wheel support and a work cradle, separate fluid pressure means for operating each of the wheel support and the work carriage and the work cradle, means for initiating movement of the work cradle when the wheel carriage has been withdrawn to inoperative position, and means responsive to movement of the work cradle for causing traverse of the work carriage, substantially as set forth.

57. In a grinding machine a bed, a work carriage, a wheel support and a work cradle, separate fluid pressure means for operating each of the wheel support and the work carriage and the work cradle, means for initiating movement of the work cradle when the wheel carriage has been withdrawn to inoperative position, means responsive to movement of the work cradle for causing traverse of the work carriage, and means for locking the wheel support and preventing its return to working position until the work carriage is moved to grinding position, substantially as set forth.

58. In a grinding machine a bed, a work carriage, a work cradle mounted thereon and a wheel support, separate fluid pressure means for moving the work cradle, the work carriage and the wheel support, and means controlled by movement of the work cradle to inoperative position for causing return of the grinding wheel support to grinding position, substantially as set forth.

59. In a machine of the kind described, a work support, a wheel support, fluid means to provide a relative transverse and longitudinal movement between said supports, means in control of said longitudinal movement, a stop adapted to engage said means to limit said movement and automatic means to remove said stop to permit further longitudinal movement.

60. In apparatus of the class described, a pair of tables or carriages, individual fluid pressure means to operate said carriages, means for setting in operation the fluid pressure to procure movement of one of said carriages, and means responsive to movement of said first carriage for setting the fluid pressure in operation to move the other carriage.

61. A machine tool comprising, in combination, a rotary work support, a tool mounted for reciprocation toward and from said support, each reciprocation comprising a feeding stroke and a return stroke, means for reciprocating said tool, hydraulic means for indexing said support during the interval between successive feeding strokes, hydraulic means automatically operable at the end of each indexing movement to lock said support in position, and hydraulic means automatically operable in each instance to prevent institution of the feeding stroke until said last mentioned means has locked said support in position.

62. In a machine of the kind described, a work support, a tool support, means to move said tool support toward and from said work support automatically, fluid means automatically operable when said tool support is moved to inoperative position to index said work support, fluid means to lock said work support in position, and means to prevent movement of the tool toward the work until the work support has been locked.

63. In a machine of the kind described, a work support, a tool support, automatic means to provide relative feeding and indexing movements of said supports, fluid means to effect said indexing movement only when said tool has been withdrawn from the work, and to lock said work support in successive positions, and automatic means operable to prevent said feeding movement until said work support has been locked in said position.

64. In a machine of the kind described, a work support, means to index said work support, a tool support, automatic means to move said tool support toward and from said work support comprising a reversing member, automatic means to partially shift said reversing member upon withdrawal of said tool, and means controlled by said indexing means to prevent further movement of said member until said work support has been indexed.

65. A grinding machine comprising a work support, a wheel support, means to provide a relative longitudinal movement between said supports for positioning the work piece and wheel for successive grinding operations, means to provide a relative transverse movement between said supports, and means responsive to the means for effecting said transverse movement to set in operation the means to cause the longitudinal movement between said supports.

66. In a grinding machine, a bed, a work carriage, a wheel support and a work cradle, separate fluid pressure means for operating each of the wheel support, the work carriage and the work cradle, and means for initiating movement of the work cradle when the wheel carriage has been withdrawn to inoperative position.

RALPH K. ROWELL.